(12) United States Patent
Terrell et al.

(10) Patent No.: US 6,588,372 B1
(45) Date of Patent: Jul. 8, 2003

(54) GEAR DRIVE LIVESTOCK FAN

(76) Inventors: Michael E. Terrell, 3801 S. Barberry, Pl., Chandler, AZ (US) 85248; Frank Gilbert Marks, 3340 S. 107th Ave., Tolleson, AZ (US) 85353; Dwight Zimmerman, P.O. Box 95, Wasco, CA (US) 93280

( * ) Notice: Subject to any disclaimer, the term of this patent is extended or adjusted under 35 U.S.C. 154(b) by 0 days.

(21) Appl. No.: 10/156,983

(22) Filed: May 29, 2002

Related U.S. Application Data

(63) Continuation-in-part of application No. 09/967,678, filed on Sep. 28, 2001.

(51) Int. Cl.[7] ................................................. B01F 3/04
(52) U.S. Cl. ........................... 119/448; 261/28; 261/30; 454/337
(58) Field of Search ................................ 119/436, 448; 454/328, 337; 416/100, 110, 170 R; 415/125; 261/30, 79.2, 28; 248/637

(56) References Cited

U.S. PATENT DOCUMENTS

| | | | | |
|---|---|---|---|---|
| 2,542,427 A | * | 2/1951 | Peck | 416/110 |
| 2,587,240 A | * | 2/1952 | Speng | 239/77 |
| 2,653,482 A | * | 9/1953 | Kinder | 74/29 |
| 4,693,852 A | * | 9/1987 | Gordon | 261/30 |
| 5,620,633 A | * | 4/1997 | Junkel et al. | 261/28 |
| 6,086,053 A | * | 7/2000 | Natschke et al. | 261/30 |
| 6,283,709 B1 | * | 9/2001 | Hill et al. | 416/110 |

FOREIGN PATENT DOCUMENTS

| | | | | |
|---|---|---|---|---|
| NL | 18474 | * | 8/1928 | 416/100 |

* cited by examiner

*Primary Examiner*—Harold Joyce
(74) *Attorney, Agent, or Firm*—James M. Duncan

(57) ABSTRACT

A gear drive fan for ventilating and cooling structures used for containing livestock. The gear drive fan comprises a livestock structure having a roof and supporting members, where the roof is connected to the supporting members, a fan assembly, and means for attaching the fan assembly to the structure. The fan assembly comprises a blade assembly having a plurality of blades and a drive hub, a housing, a first electrical motor having a drive shaft, and a gearbox having a drive end and a hub end. The drive end of the gearbox is adapted to be closely coupled to the drive shaft of the motor, while the hub end is adapted to be closely coupled to the drive hub of the blade assembly, so that the motor and gearbox may be conveniently mounted to the blade housing or contained within the blade housing. The means for attaching the fan assembly to the structure include an wall-mounted or ceiling-mounted box enclosure, an oscillating enclosure, and an enclosure which is suspended by an adjustable hanger connected to a support member of the livestock structure.

18 Claims, 6 Drawing Sheets

GEAR DRIVE LIVESTOCK FAN

CROSS-REFERENCE TO RELATED APPLICATION

This is a continuation-in-part of U. S. application Ser. No. 09/967,678, filed on Sep. 28, 2001, to which the inventors claim domestic priority.

BACKGROUND OF THE INVENTION

The present invention generally relates to devices for cooling livestock and more specifically to a gear drive fan for ventilating and cooling a livestock structure. The subject gear driven fan may be implemented alone, or combined with means for injecting water droplets into the air stream of the fan blade and/or means for oscillating the fan assembly through a plurality of rotational positions.

It is known in animal agriculture to cool livestock with evaporative cooling by wetting the animal and then drying the animal through mechanical ventilation or via natural ventilation. Mechanical ventilation is often provided by cooling fans. The cooling fans typically have blade diameters of thirty-six inches and larger, with forty-eight inch diameter being a common size. Depending upon the temperature and humidity, it is often necessary to move a large volume of air to adequately cool the livestock.

Two types of fans are known to be used for cooling livestock. The first type is a belt drive fan, such as disclosed in U. S. Pat. No. 4,693,852. In this type of cooling fan, a motor powers a belt and pulley to rotate the fan blades. The second type is a direct drive fan, where the fan blades are mounted directly to the motor shaft. Each type has its advantages and disadvantages.

The blade of a direct drive fan rotates at the same RPM as the motor shaft, typically 1170 RPM or 1750 RPM. High blade speeds result in excessive noise. Moreover, running fan blades at high speeds is inefficient. Air flow increases linearly with an increase in RPM, according to the equation $CFM_1/CFM_2 = RPM_1/RPM_2$. However, horsepower requirements increase with the cube of the RPM, according to the equation $HP_1/HP_2 = (RPM_1/RPM_2)^3$. Another disadvantage, particularly for large diameter fans, is that any wind or other phenomena which slows or reverses the blades may result in harmful torque to the motor. Lower fan speeds reduce potential damage to the motor from harmful torque.

The belt drive system allows a blade speed slower than the shaft speed of the motor, resulting in lower power requirements and noise levels. Belt drive fans also allow changing the blade speed of the fan by changing pulley size on either the motor shaft or blade shaft. However, belt drive fans have their own disadvantages. Belt slippage causes a decrease in air flow in the fan which can result in morbidity and/or mortality in livestock, particularly in poultry houses. Belt drive systems require regular maintenance, and belts must frequently be replaced. It is not uncommon for a belt drive fan to throw a belt resulting in the fan being taken out of service, potentially for a long period of time. Belt drive systems also require additional parts such as shafts and bearings, none of which are particularly suited to a humid or wet environment. Most belt drive systems, such as that disclosed in U. S. Pat. No. 4,693,852, have the motor and belts contained within the same enclosure as the fan blades, requiring the enclosure to be opened to gain access to the belts.

SUMMARY OF THE INVENTION

The present invention is directed to a gear drive fan for ventilating and cooling structures used for containing livestock. The disclosed gear drive fan comprises a livestock structure having a roof and supporting members, where the roof is connected to the supporting members, a fan assembly, and means for attaching the fan assembly to the structure. The fan assembly comprises a blade assembly having a plurality of blades and a drive hub, a housing, a first electrical motor having a drive shaft, and a gearbox having a drive end and a hub end. The drive end of the gearbox is adapted to be closely coupled to the drive shaft of the motor, while the hub end is adapted to be closely coupled to the drive hub of the blade assembly, so that the motor and gearbox may be conveniently mounted to the housing or contained within the housing. The blades radiate outwardly from the hub, such that the blades create an air stream upon rotation of the blade assembly. The means for attaching the fan assembly to the structure include an wall-mounted or ceiling-mounted box enclosure, an oscillating enclosure, and an enclosure which is suspended by an adjustable hanger connected to a support member of the livestock structure.

In another embodiment, the gear drive fan further comprises means for injecting water droplets into the air stream of the fan blade.

In another embodiment, the motor may be connected to a variable frequency drive for even further speed control of the fan blades.

These and other features, aspects, and advantages of the present invention will become better understood with regard to the following description, appended claims, and accompanying drawings.

DETAILED DESCRIPTION OF THE EMBODIMENTS

Figure 1:
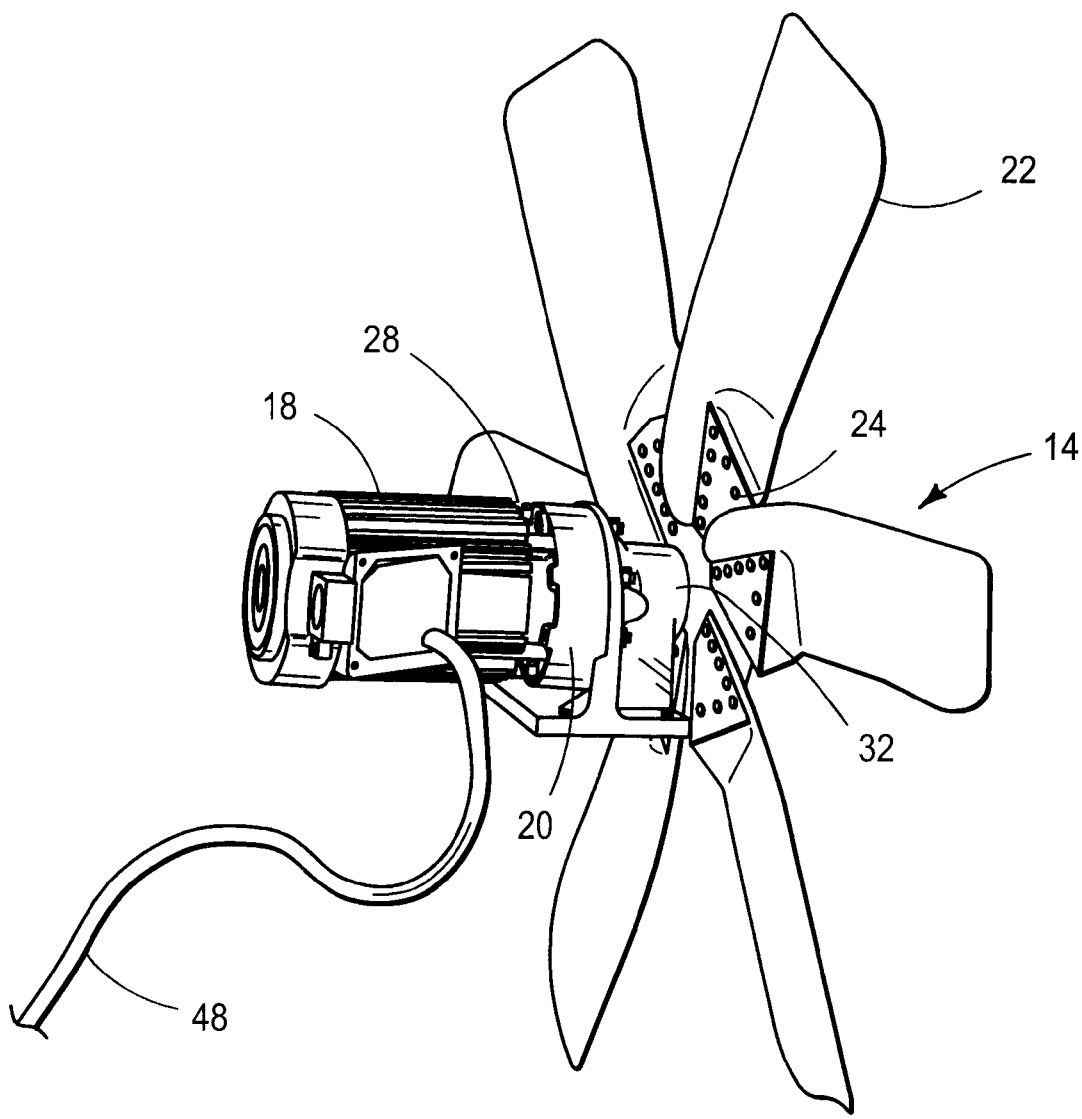
FIG. 1 is an isometric view of the fan assembly without the housing.
Figure 2:
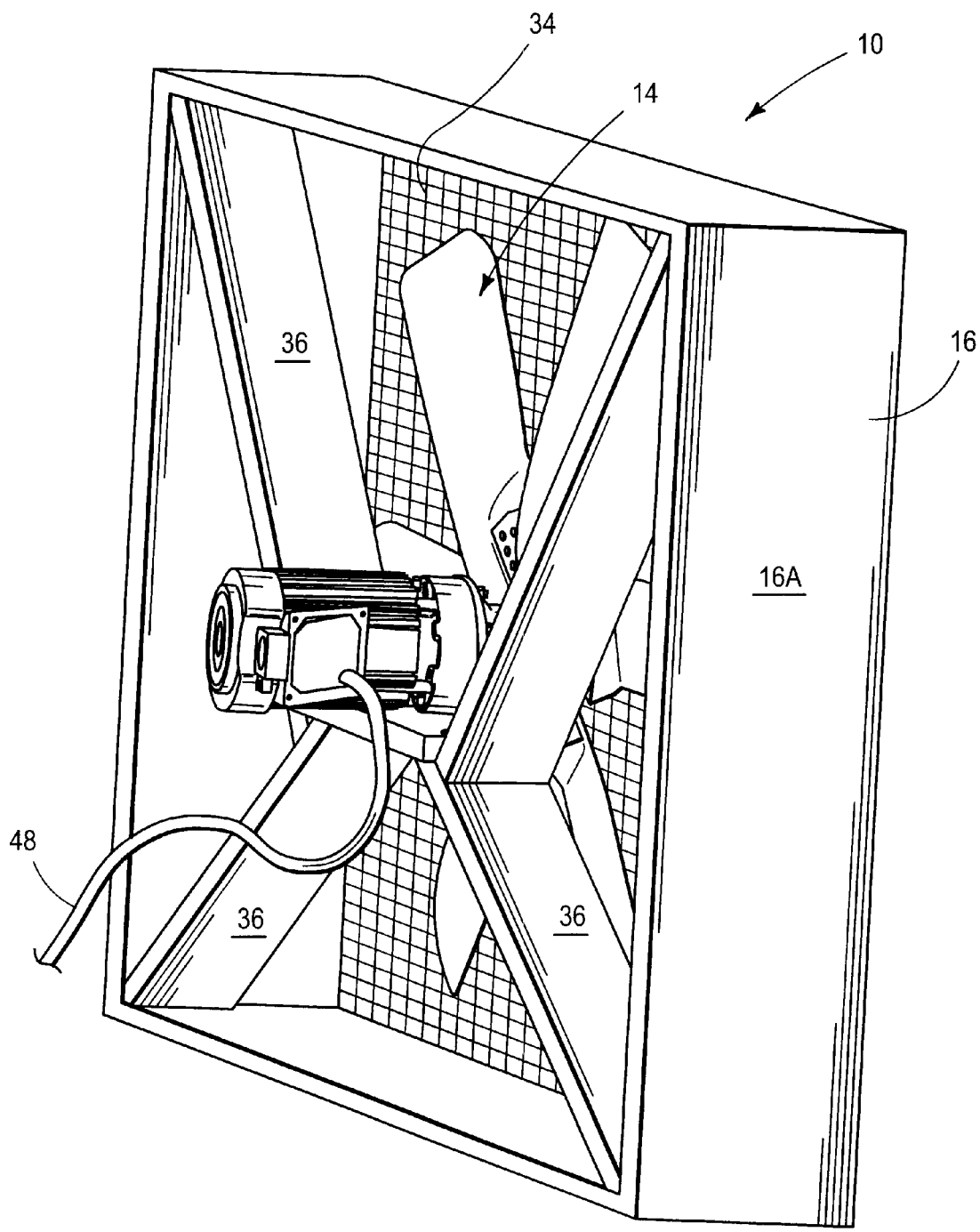
FIG. 2 shows the fan assembly with a box enclosure.
Figure 3:
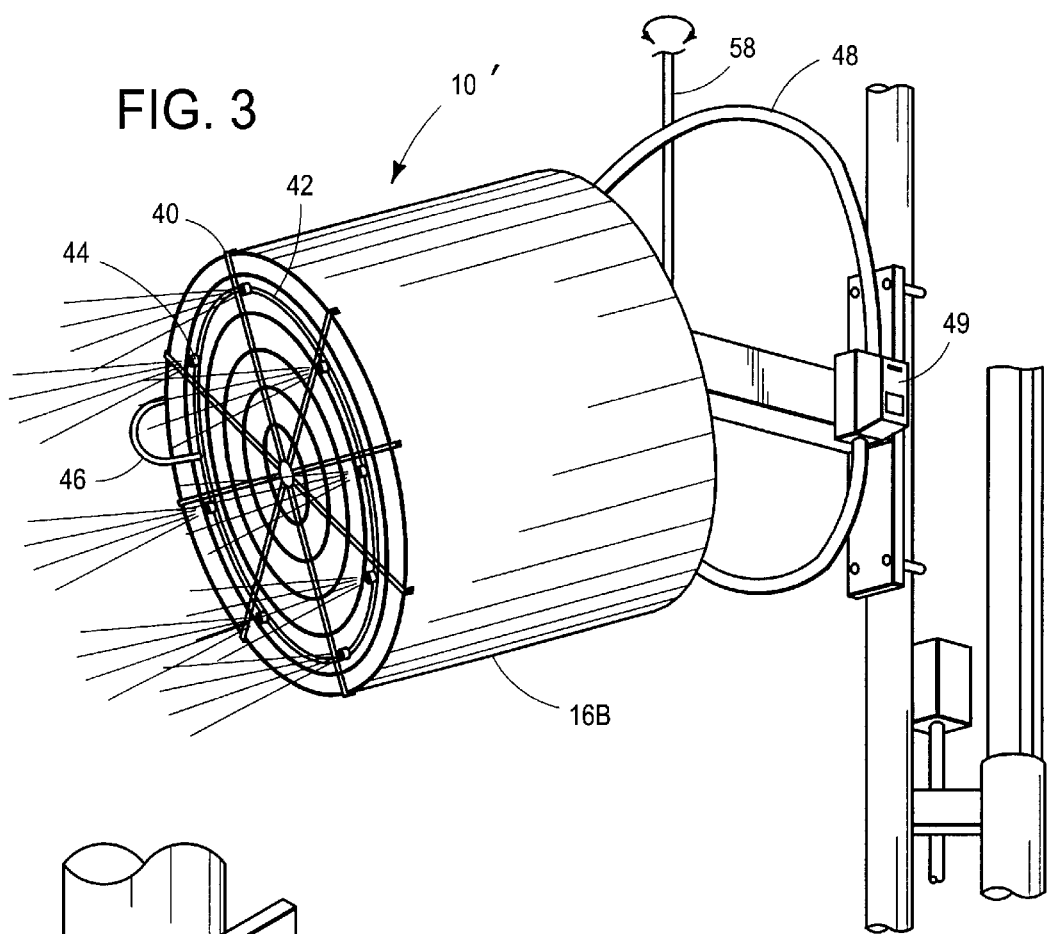
FIG. 3 is a front isometric view of the fan assembly configured for oscillation and water misting.
Figure 5:
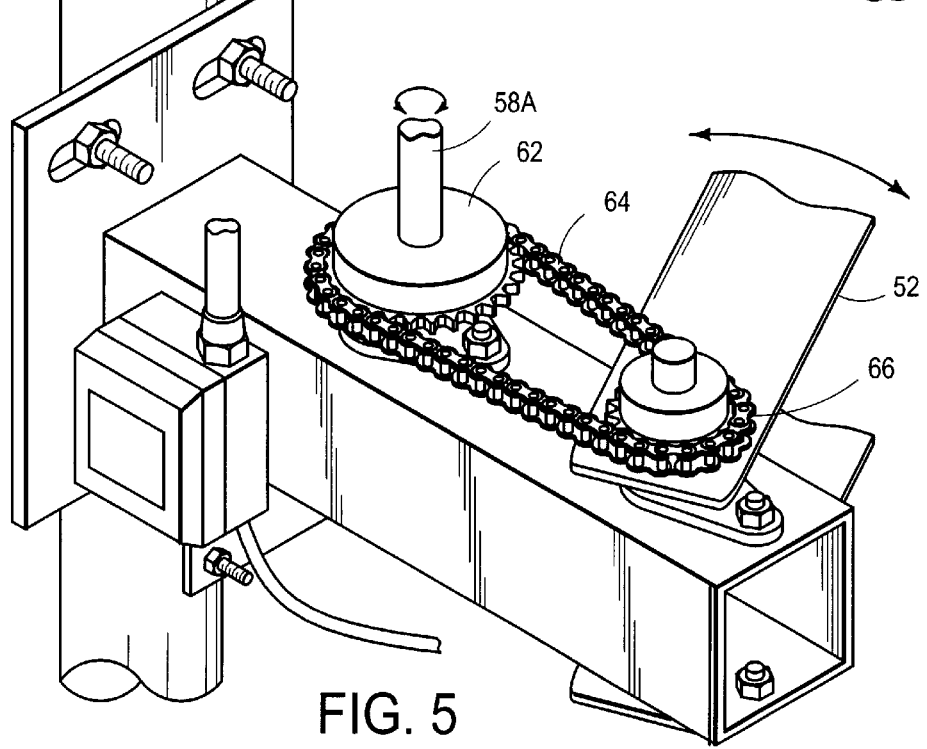
FIG. 5 is a detailed view of components used for oscillating the fan assembly.
Figure 4:
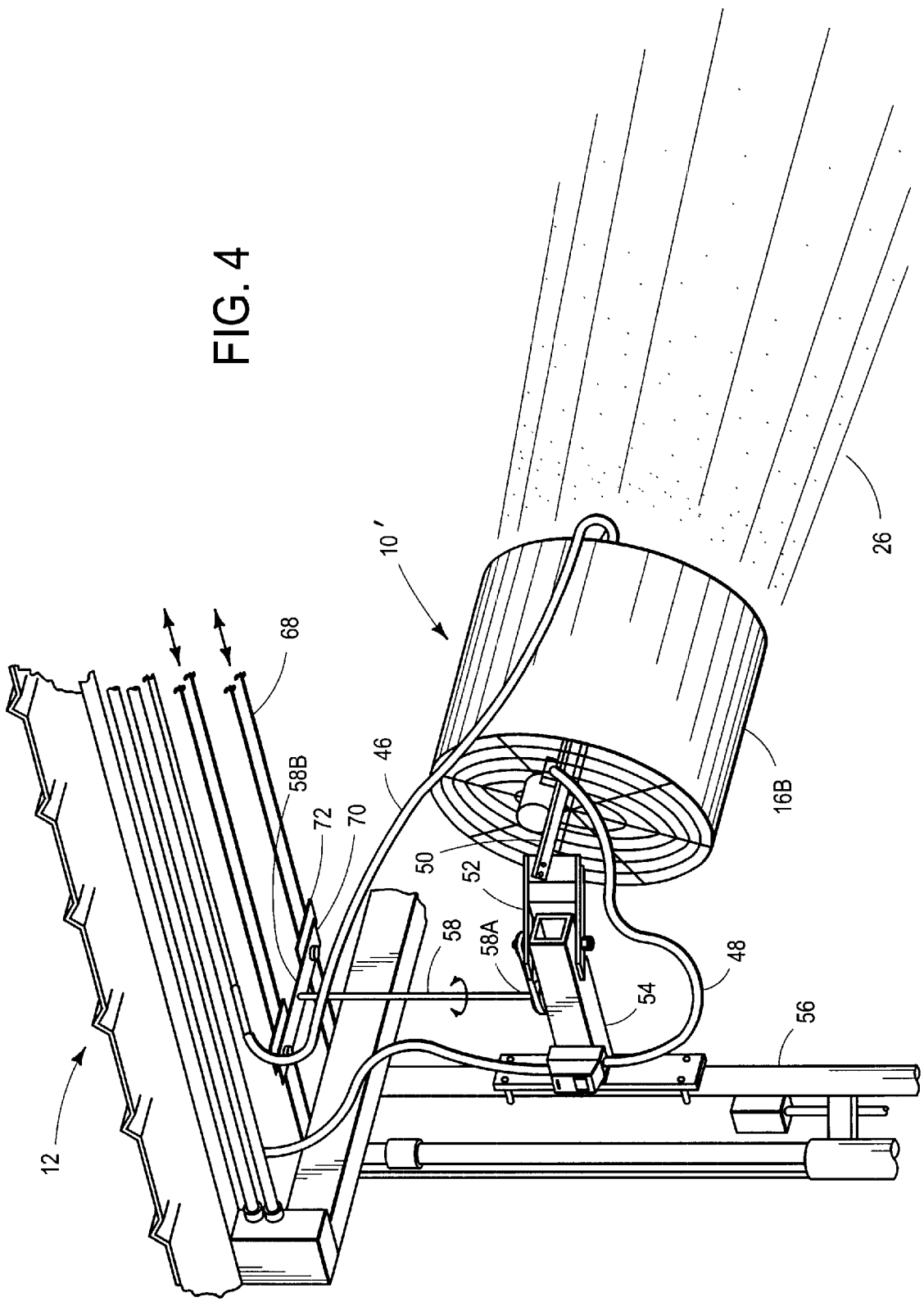
FIG. 4 is a rear isometric view of the fan assembly configured for oscillation and water misting.
Figure 6:
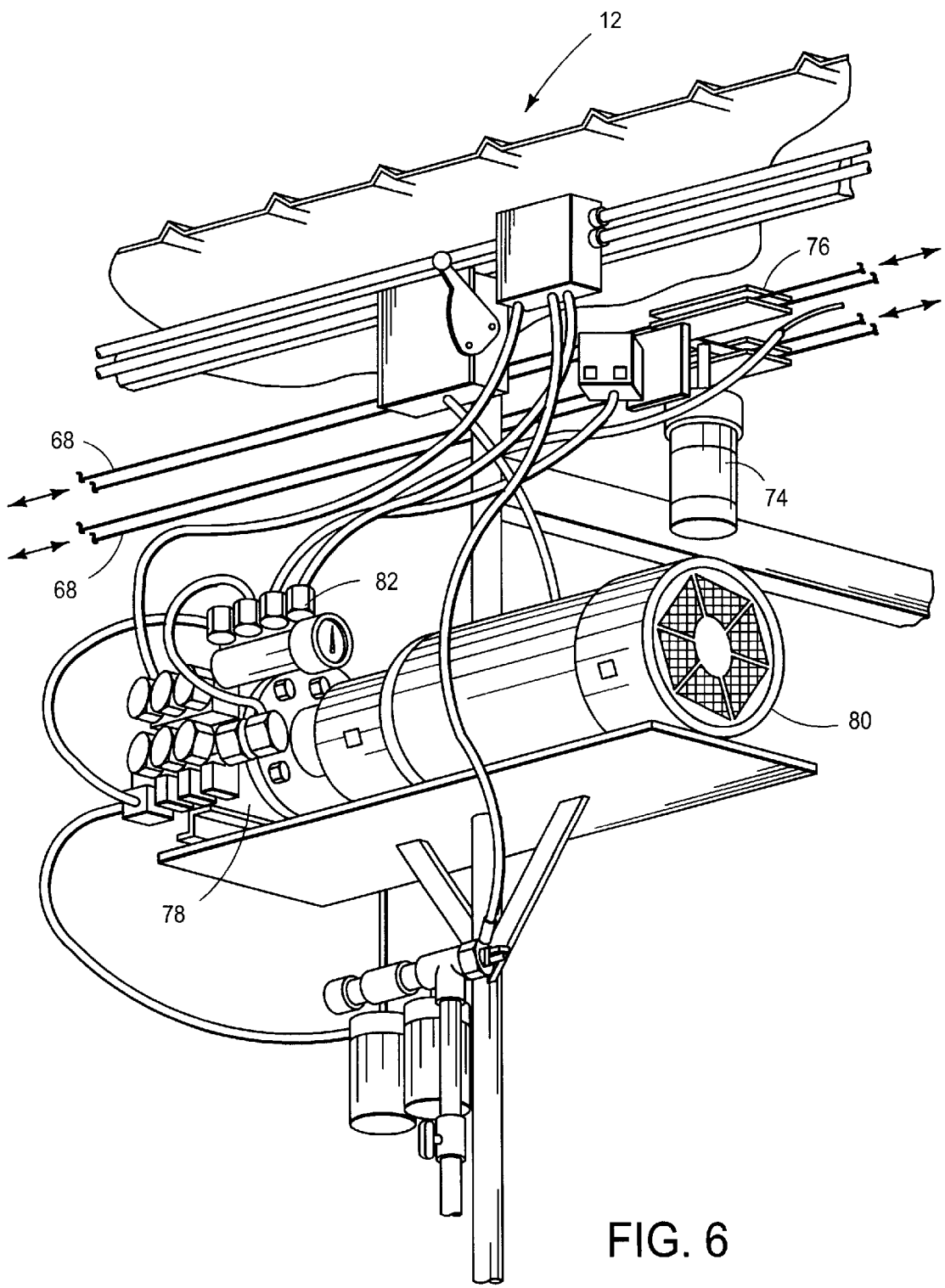
FIG. 6 shows a pump and motor which may be used for oscillating the fan assembly and delivering water to the fan assembly.
Figure 7:
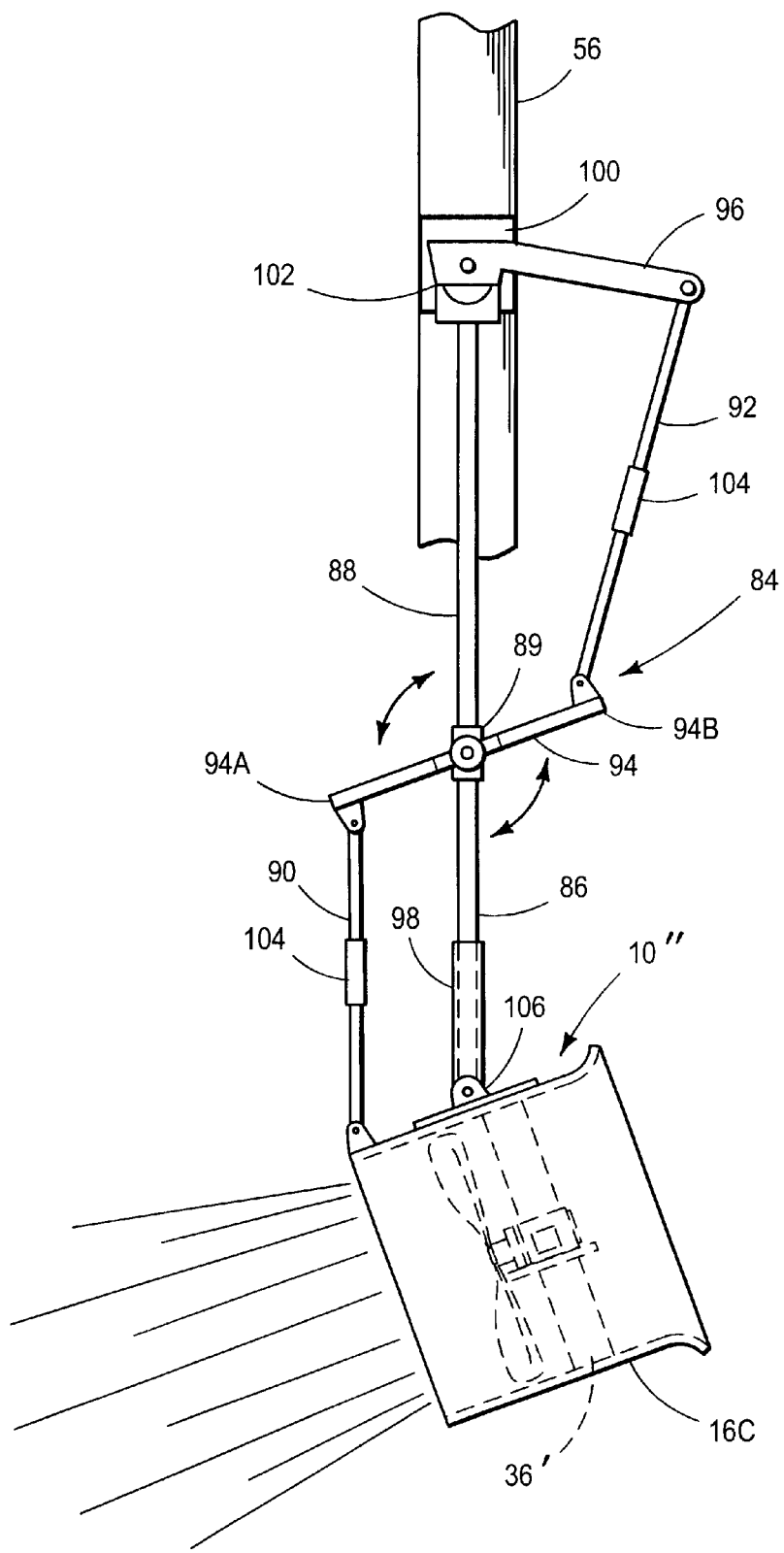
FIG. 7 shows the fan assembly mounted on an adjustable suspension hanger.

Referring now specifically to the drawings, FIGS. 1 and 2 show the fan assembly 10 of the disclosed gear drive fan for ventilating and cooling a livestock structure 12. Such livestock structures might include protective structures for dairy cows such as milking barns, free-stall barns, Saudi-style barns, and corral sun shades. Other applicable livestock structures would be poultry barns and swine barns. FIGS. 3, 4 and 7 depict alternative mounting options, i.e. , means for attaching the fan assembly to the structure, for supporting and utilizing the fan assembly 10 in the desired livestock structure.

The fan assembly 10 comprises a blade assembly 14, a housing 16 enclosing the blade assembly 14, an electrical motor 18, a gear box 20, and means for attaching the fan assembly 10 to the structure 12. The blade assembly 14 comprises a plurality of blades 22 and a drive hub 24. The blades 22 radiate outwardly from the drive hub 24. The blades 22 create an air stream 26 upon rotation of the blade assembly 14. The housing 16 which encloses the blade assembly 14 may vary according to the means implemented for attaching the fan assembly 10 to the livestock structure 12. For example, FIG. 2 depicts a box enclosure 16A for mounting in the walls, supporting members 56, or roof of the structure 12; FIGS. 3 and 4 depict a round enclosure 16B which has mounting brackets at the rear of the enclosure; and FIG. 7 depicts a round enclosure 16C which has mounting brackets at the top of the enclosure.

Acceptable models of motor 18 and gear box 20 are available as a unit, and may be obtained from Sumitomo Manufacturing. Gear box reduction ratios of four-to-one up through twelve-to-one combined with motors having nominal running speeds of 1750 RPM and 3450 RPM provide blade speeds ranging from approximately 240 to 440 RPM. The gear box 20 is closed, and is closely coupled on the drive end 28 of the gear box to the shaft of the motor 18. The hub end 32 of the gear box 20 is closely coupled to the drive hub 24. A friction clutch or other device which enables the motor to disengage from the clutch may be included between the motor 18 and the gear box 20. Likewise, such a device may be included between the gear box 20 and the drive hub 24. A shear pin or other breakaway device might also be used in coupling the drive hub 24 to the gear box 20, to allow the blade assembly 14 to disengage from the gear box 20 in the event the blades 22 become obstructed. It will be appreciated that closely coupling the gear box 20 to the motor 18 and the drive hub 24 allows for a compact configuration which eliminates the need for additional drive linkage and allows the motor 18 and gear box 20 to be enclosed within a housing 16 capable of being mounted to the desired structure 12 according to the design requirements of the particular livestock operation.

Box enclosure 16A, as depicted in FIG. 2, is one type of housing 16 for enclosing the blade assembly 14, comprising the means for attachment to the structure 12. Among other installation options, the box enclosure 16A may be mounted within vertical walls enclosing a livestock structure, or mounted to the roof of the livestock structure 12. The fan may be mounted so as to allow either negative or positive pressure ventilation. The motor 18 coupled to the gear box 20 is mounted within the box enclosure on mounts 36. Control of airflow into the livestock structure may be controlled by having louvered or other types of adjustable openings on the negative pressure side of the blade assembly 14. Water particles may be placed into the air stream 26 by attaching a mist ring to the front screen 34 of the box enclosure 16A. Alternatively, water absorbent padding may be placed on the negative pressure side of the blade assembly 14 for drawing water vapor into the air stream 26. Alternatively, water discharging plenums may be located on the negative pressure side of the blade assembly 14. Other structures for dispensing water into the air stream 26 may be located on the positive pressure side of the blade assembly 14 so that water particles are discharged into the air stream 26. Such structures may include water-discharging plenums, nozzles and other similar structures.

As will be appreciated by those skilled in the art, negative pressure facilities require a tremendous volume of air flow, thus requiring large blade fans. The known large blade fans used to create a negative pressure environment are belt driven, having the disadvantages previously discussed. The disclosed fan, in all embodiments, overcomes the disadvantages of belt-drive fans and is well-suited for creating negative pressure in a livestock structure in order to draw air through a mixing chamber or fogged plenum or for drawing air through a wet wall.

FIGS. 3 and 4 depict another means for attachment to the structure 12. Each fan assembly 10' includes a round enclosure 16B, with the motor 18 and gear box 20 attached to mounts 36'. Grill 40 is attached to the front of the enclosure 16B. A mist ring 42 may be attached to the grill 40, with nozzles 44 connected to the mist ring 42. A water supply line 46 is attached to mist ring 42 for providing high pressure water to the nozzles 44. Power cable 48 provides electrical power to the motor 18. Motor starter 49 allows remote starting of motor 18. Mounting bracket 50, which is attached to the rear of enclosure 16B, supports the weight of fan assembly 10'. Mounting bracket 50 is connected to pivot arm 52 which is rotationally attached to stationary member 54, which is attached to a supporting member 56 or other member of the structure 12. Fan assembly 10' creates air stream 26 into which water droplets may be injected from the nozzles 44 mounted within the mist ring 42.

Oscillation means are provided to the fan assembly 10' which allows each fan to oscillate within a pre-programmed arc, up to a maximum of 270 degrees for the embodiment shown in FIG. 4. Various oscillation means may be operably attached to the fan assembly 10' which rotate the fan assembly through a plurality of rotational positions. The oscillation means may comprise a drive shaft 58, having a first end 58A and a second end 58B, to which means for rotational motion are applied so as to rotate drive gear 62. Drive gear 62 imparts rotation to pivot arm 52 by use of a chain 64 connected to free gear 66, thereby causing oscillation of fan assembly 10'. Alternatively, chain 64 may be eliminated by either directly enmeshing drive gear 62 to free gear 66 to provide direct drive, or by connecting drive gear 62 to free gear 66 with linkage arms.

Various means for applying rotational motion to drive shaft 58 are available. In the embodiment disclosed in FIG. 4, cables 68 are connected to drive shaft flange 70, attached to second end 58B, by drive shaft clamps 72. Instead of using drive shaft flange 70, it is also possible to connect cables 68 to a drum attached to drive shaft 58. If a drum is used, it is possible to increase the maximum arc of oscillation to a value greater than 270 degrees.

As an alternative to cables 68, other linkage means known in the art may be utilized, such as rods. As further shown in FIG. 4, cables 68 may extend past drive shaft flange 70 and provide rotational motion to additional drive shafts 58 causing oscillation of additional fan assemblies 10'. As shown in FIG. 6, cables 68 are connected to the shaft of oscillation motor 74 by oscillation clamps 76. A grooved drum connected to the drum of oscillation motor 74 may be used instead of oscillation clamps 76. As further shown in FIG. 6, cables 68 may extend in both directions from oscillation motor 74, so fan assemblies 10 may be placed on either side of oscillation motor 74.

Water droplets are injected into the air stream 26 created by each fan assembly 10'. Water is delivered to the mist ring 42 through a high pressure water line 46. Stainless steel or other corrosion resistant materials with acceptable pressures ratings are acceptable materials for construction of the mist ring 42. A plurality of nozzles 44 are attached to the mist ring 42. Nozzles 44 may be screwed into female connections welded to mist ring 42, or otherwise attached. Water is delivered into high pressure water supply line 46 by pump 78. Pump 78 may be a plunger pump available through General Pump of Mendota Heights, MN or Cat Pumps of Minneapolis, MN. Pump 78 is driven by pump motor 80.

The pump flow rate of pump 78, and thus outlet pressure, may be controlled by various pressure control means. The pump flow rate may be increased or decreased by controlling the revolutions per minute of motor 80 with a variable frequency drive resulting in increased or decreased output pressure. Alternatively, output pressure of pump 78 may be controlled through a plurality of solenoid-activated by-pass valves 82. The solenoids are controlled by a thermostat set within a local control panel so that when required by hotter temperatures, the solenoids will sequentially close a by-pass valve 82 to increase pressure to nozzles 44, and water volume.

FIG. 7 is shows another means for attaching a fan assembly 10" to the structure 12 by using an adjustable suspension hanger 84. The adjustable suspension hanger comprises lower shaft 86, upper shaft 88, lower tie arm 90, upper tie arm 92, pivot arm 94, anchor arm 96 and hanger attachment 98. Lower shaft 86 is coupled to upper shaft 88 by pivot coupling 89. Pivot arm 94 has a first end 94A and a second end 94B. Lower tie arm 90 is connected at one end to the first end 94A of pivot arm 94 and at the other end to the top of the enclosure 16C. Upper tie arm 92 is connected at one end to the second end 94B of pivot arm 94 and at the other end to anchor arm 96. Hanger attachment 98 connects to hanger 106 which is attached to the top of enclosure 16C. Anchor arm 96 is attached to mounting plate 100 which is fastened to a supporting member 56 or other member of the structure 12. Upper shaft 88 is attached to rotating collar 102, which is pivotally attached to mounting plate 100, thereby allowing the fan assembly 10" to pivot about the mounting plate 100. The flexibility provided by the adjustable suspension hanger, and the ability of the fan assembly 10" to pivot about the mounting plate 100 reduces stress on the motor 18 and gear box 20 induced by wind or other phenomena. The lengths of lower tie arm 90 and upper tie arm 92 may be adjusted with adjustment means, such as turnbuckle 104. As shown in FIG. 7, the angle of fan assembly 10" may be adjusted to provide the desire orientation of the air stream 26 by adjusting the lengths of lower tie arm 90 and upper tie arm 92.

Lower shaft 86 and upper shaft 88 may be constructed from pipe, such as one and one-half inch steel pipe. Hanger attachment 98 may be a threaded collar attaching to threads on lower shaft 86, allowing extending or shortening of the adjustable suspension hanger 84.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. A gear drive fan for ventilating and cooling a livestock structure comprising:
    (a) a livestock structure comprising a roof and supporting members, the roof connected to the supporting members;
    (b) a fan assembly comprising:
        (i) a blade assembly comprising a plurality of blades and a drive hub, the blades radiating outwardly from the hub, the blades creating an air stream upon rotation of the blade assembly;
        (ii) a housing enclosing the blade assembly;
        (iii) a first electrical motor;
        (iv) a gearbox having a drive end and a hub end, wherein the drive end is adapted to be closely coupled to the first electrical motor and the hub end is adapted to be closely coupled to the drive hub; and
    (c) means for attaching the fan assembly to the livestock structure.

2. The gear drive fan of claim 1 wherein the housing comprises a box enclosure.

3. The gear drive fan of claim 2 wherein the means for attaching the fan assembly to the livestock structure comprises mounting the box enclosure to the roof of the livestock structure.

4. The gear drive fan of claim 2 wherein means for attaching the fan assembly to the livestock structure comprises mounting the box enclosure to a supporting member of the livestock structure.

5. The gear drive fan of claim 1 wherein the housing comprises a round enclosure.

6. The gear drive fan of claim 5 wherein the means for attaching the fan assembly to the livestock structure comprises mounting the round enclosure to a supporting member of the livestock structure.

7. A gear drive fan for ventilating and cooling a livestock structure comprising:
    (a) a livestock structure comprising a roof and supporting members, the roof connected to the supporting members;
    (b) a fan assembly comprising:
        (i) a blade assembly comprising a plurality of blades and a drive hub, the blades radiating outwardly from the hub, the blades creating an air stream upon rotation of the blade assembly;
        (ii) a housing enclosing the blade assembly;
        (iii) a first electrical motor;
        (iv) a gearbox having a drive end and a hub end, wherein the drive end is adapted to be closely coupled to the first electrical motor and the hub end is adapted to be closely coupled to the drive hub;
    (c) means for attaching the fan assembly to the structure; and
    (d) means for injecting water droplets into the air stream.

8. The gear drive fan of claim 7 wherein the means for injecting water droplets into the air stream comprises a pump, a second motor, a mist ring having a plurality of nozzles, and a water supply line wherein the second motor is operationally attached to the pump, and the water supply line connects the pump to the mist ring.

9. The gear drive fan of claim 8 wherein a grill is attached to the housing and the mist ring is attached to the grill.

10. A gear drive fan for ventilating and cooling a livestock structure comprising:
    (a) a livestock structure comprising a roof and supporting members, the roof connected to the supporting members;
    (b) a fan assembly comprising:
        (i) a blade assembly comprising a plurality of blades and a drive hub, the blades radiating outwardly from the hub, the blades creating an air stream upon rotation of the blade assembly;
        (ii) a housing enclosing the blade assembly;
        (iii) a first electrical motor;
        (iv) a gearbox having a drive end and a hub end, wherein the drive end is adapted to be closely coupled to the first motor and the hub end is adapted to be closely coupled to the drive hub;

(c) means for rotatably attaching the fan assembly to the structure; and (d) means for oscillating the fan assembly through a plurality of rotational positions.

11. The gear drive fan of claim 10 wherein the means for oscillating the fan assembly comprises:

(a) a drive shaft having a first end and a second end;

(b) a drive gear attached to the first end of the drive shaft;

(c) means for applying rotational motion to the drive shaft;

(d) a pivot arm operably attached to the fan assembly;

(e) a free gear coupled to the pivot arm; and (f) means for connecting the drive gear to the free gear so the means for applying rotational motion to the second end cause the drive gear to rotate turning the free wheel, pivot arm and fan assembly.

12. The gear drive fan of claim 11 wherein the means for connecting the drive gear to the free gear comprises a chain.

13. The gear drive fan of claim 11 wherein the means for applying rotational motion to the drive shaft comprises an oscillation motor.

14. The gear drive fan of claim 10 further comprising means for injecting water droplets into the air stream.

15. The gear drive fan of claim 14 wherein the means for injecting water droplets into the air stream comprises a pump, a second motor, a mist ring having a plurality of nozzles, and a water supply line wherein the second motor is operationally attached to the pump, and the water supply line connects the pump to the mist ring.

16. The gear drive fan of claim 15 wherein a grill is attached to the housing and the mist ring is attached to the grill.

17. A gear drive fan for ventilating and cooling a livestock structure comprising:

(a) a livestock structure comprising a roof and supporting members, the roof connected to the supporting members;

(b) a fan assembly comprising:

(i) a blade assembly comprising a plurality of blades and a drive hub, the blades radiating outwardly from the hub, the blades creating an air stream upon rotation of the blade assembly;

(ii) a round housing enclosing the blade assembly, the housing having a hanger attached;

(iii) a first electrical motor;

(iv) a gearbox having a drive end and a hub end, wherein the drive end is adapted to be closely coupled to the first electrical motor and the hub end is adapted to be closely coupled to the drive hub; and (c) an adjustable suspension hanger connecting the fan assembly to a supporting member of the livestock structure.

18. The gear drive fan of claim 17, the adjustable suspension hanger further comprising a (a) a lower shaft; (b) an upper shaft; (c) a pivot coupling; (d) a lower tie arm; (e) an upper tie arm; (f) a pivot arm having a first end and a second end; (g) an anchor arm; and (h) a hanger attachment, wherein the lower shaft is coupled on one end to the upper shaft by the pivot coupling and the lower shaft is coupled on the other end to the hanger attachment, the lower tie arm is pivotally connected at one end to the first end of the pivot arm and pivotally attached at the other end to the top of the round housing, the upper tie arm is pivotally connected at one end to the second end of the pivot arm and pivotally connected at the other end to the anchor arm, and the hanger attachment connects to the fan assembly.

\* \* \* \* \*